United States Patent [19]
Yang

[11] Patent Number: 5,028,771
[45] Date of Patent: Jul. 2, 1991

[54] BAR CODE READER

[75] Inventor: Keun Y. Yang, Seoul, Rep. of Korea

[73] Assignee: Goldstar Co., Ltd., Seoul, Rep. of Korea

[21] Appl. No.: 485,578

[22] Filed: Feb. 27, 1990

[30] Foreign Application Priority Data

Feb. 28, 1989 [KR] Rep. of Korea ............... 2446/1989

[51] Int. Cl.$^5$ ............................................. G06K 7/10
[52] U.S. Cl. .................................... 235/462; 235/457; 235/467; 235/470
[58] Field of Search ............... 235/457, 462, 467, 470; 350/331 R

[56] References Cited
U.S. PATENT DOCUMENTS 4,484,019 8/1984 Gagnon ..................... 350/331 R
4,836,649 6/1989 Ledebuhr .................. 350/331 R
4,978,202 12/1990 Yang ............................ 235/457 X Primary Examiner—Harold Pitts
Attorney, Agent, or Firm—Birch, Stewart, Kolasch & Birch

[57] ABSTRACT

A bar code reader includes a hologram disk having an arcuate circular shaped hologram disk disposed on a disk where the laser beam from a laser beam generator is applied. A laser controller is used for controlling the generating of the laser beam, and included are a signal analyzing unit having pre-amplifiers, a lock-in amplifier, a level shifter, an envelope detector, a waveform shaper, a decoding logic and a signal analyzer, a pair of photodetectors for detecting laser beams from the hologram disk, and a focusing lens, and a mirror member for forming a scanning pattern with a laser beam diffracted by the hologram disk.

4 Claims, 4 Drawing Sheets

BAR CODE READER

CROSS REFERENCE TO RELATED APPLICATIONS

The Examiner is hereby advised of co-pending U.S. applications, Ser. Nos. 07/351,049 filed May 12, 1989, U.S. Pat. No. 4,978,202, and 07/355,346 filed May 23, 1989 U.S. Pat. No. 4,999,482. The Ser. Nos. 07/351,049 and 07/355,346, is related to the present application and thus may be relevant to the subject matter of this instant application.

BACKGROUND OF THE INVENTION

1. Field of the Invention

The present invention relates to a bar code reader which is capable of precisely scanning the bar code information by a modulated laser beam.

2. Description of the Prior Art

Conventional bar code reader is illustrated in FIG. 1, which is structured with reflective mirrors 4 and 4' for reflecting a laser beam generated from a laser beam generator 3 toward a hologram disk 1, a mirror member 5 for forming a scanning pattern by reflecting a laser beam at various angles which is diffracted and scanned by the hologram disk 1, a photodetector 8 for detecting the beam focused on a focusing lens 7 after being reflected from the reflective mirror 4', and a signal analyzing unit 9 for analyzing and processing the output signal of the photodetector 8.

The laser beam generated from the laser beam generator 3 according to such conventional bar code is reflected from the reflective mirror 4 and the laser beam thus reflected passes through the focusing lens 7, thereafter reflected from the reflective mirror 4' and entered into the hologram disk 1. The hologram disk 1 is structured by a number of holograms 1a disposed radially on a circular plate in a predetermined angle as shown in FIG. 2.

Accordingly, as the hologram disk 1 rotates upon the driving of the motor 2, the laser beam being incident upon the hologram disk 1 is diffracted by the hologram disk 1 and scanned on the mirror member 5, thereby a scanning pattern is formed by the mirror member 5 and is scanned through a window 6 on an object 12 that a bar code is printed. At this moment, the laser beam is dispersed by the bar code printed on the object 12 and the dispersed laser beam is focused on the focusing lens 7 after passing through the window 6, the mirror member 5 and the hologram disk 1, then the focused laser beam is detected by the photodetector 8 and analyzed and processed by the signal analyzing unit 9, thereby reading the bar code information of the object 12.

However, such conventional bar code reader have a number of problems such as, for example, since the sizes of the mirror member for forming the scanning pattern, the holograms for constituting the hologram disk, the reflective mirrors and focusing lens have to be large in order to increase the quantity of the beam detected at the photodetector, thereby giving rise to the increase in size and cost of the system.

SUMMARY OF THE INVENTION

Accordingly, it is an object of the present invention to provide an improved bar code reader which can precisely scan the laser beam dispersed by the bar code printed on an object without increasing the sizes of the optical components such as a mirror member, holograms reflective mirror, and a focusing lens.

Another object of the present invention is to provide a bar code reader which is provided with the laser beam modulated and outputted from laser beam generated upon the control of a laser controller, the outputted laser beam being detected at a photodetector through reflective mirror and hologram disk and applied to a signal analyzer in a reference signal, the laser beam diffracted by the hologram disk being converted into a scanning pattern by the mirror set and applied to and dispersed from the bar code printed on an object through a window, the laser beam dispersed being focused on a focusing lens and detected by the photodetector and then applied to a signal analyzer as a detection signal. Thereafter, the detection signal is synchronized with the reference signal.

Other objects and further scope of applicability of the present invention will become apparent from the detailed description given hereinafter. It should be understood, however, that the detailed description and specific examples, while indicating preferred embodiments of the invention, are given by way of illustration only, since various changes and modifications within the spirit and scope of the invention will become apparent to those skilled in the art from this detailed description.

Briefly described, the present invention relates to a bar code reader which comprises a hologram disk having an arcuate circular shaped hologram disk disposed on a disk where the laser beam from a laser beam generator is applied, a laser controller for controlling the generating of the laser beam, a signal analyzing unit having pre-amplifiers, a lock-in amplifier, a level shifter, an envelope detector, a waveform shaper, a decoding logic and a signal analyzer, a pair of photodetectors for detecting laser beams from the hologram disk, and a focusing lens, and a mirror member for forming a scanning pattern with a laser beam diffracted by the hologram disk.

BRIEF DESCRIPTION OF THE DRAWINGS

The present invention will become more fully understood from the detailed description given hereinbelow and the accompanying drawings which are given by way of illustration only, and thus are not limitative of the present invention, and wherein.

DESCRIPTION OF THE PREFERRED EMBODIMENTS

Figure 1:
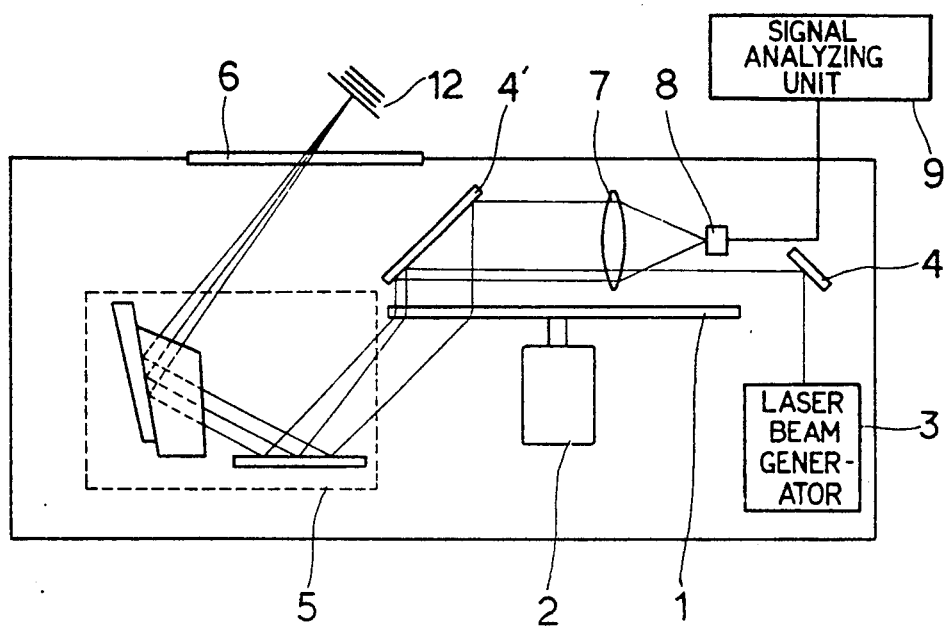
FIG. 1 is a block diagram illustrating a conventional bar code reader.
Figure 2:
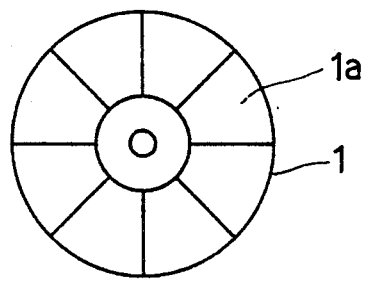
FIG. 2 is a top plan view illustrating a hologram disk of FIG. 1.
Figure 3:
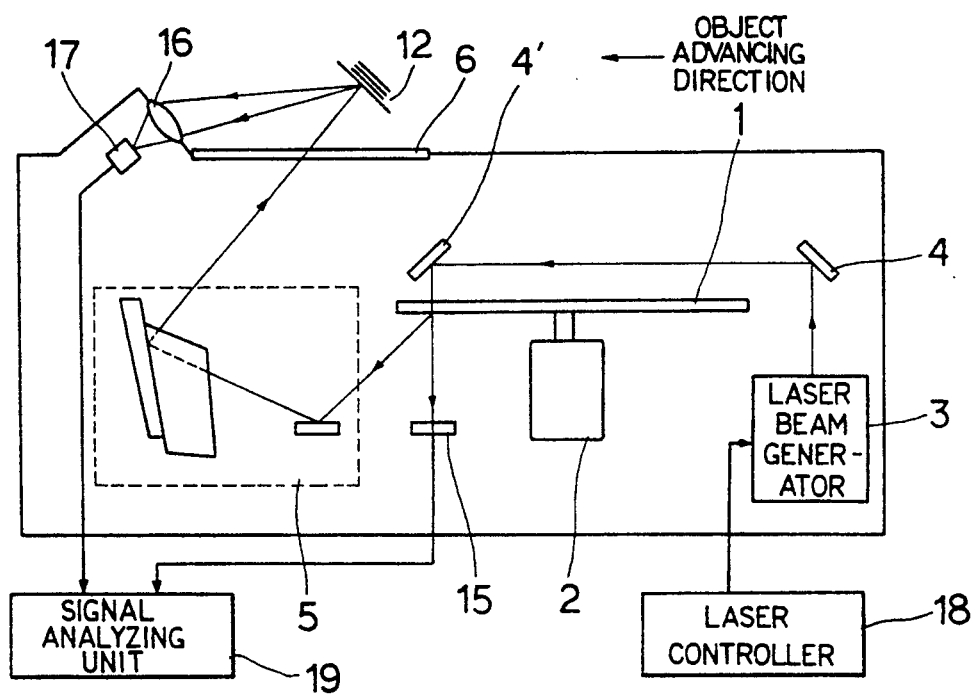
FIG. 3 is a block diagram illustrating the bar code reader according to the present invention.

Referring now in detail to the drawings for the purpose of illustrating preferred embodiments of the present invention, the bar code reader as shown in FIG. 3, which is structured with a laser controller 18 for controlling the generation of laser beam, a laser beam generator 3 for modulating and outputting the laser beam upon the control of the laser controller 18, reflective mirrors 4 and 4' for reflecting the laser beam generated from the laser beam generator 3, a hologram disk for allowing allows the laser beam reflected from the reflective mirrors 4 and 4' so as to pass therethrough and diffract therefrom, a first photodetector 15 for detecting the laser beam passing through the hologram disk 1, a mirror member 5 for converting the laser beam diffracted from the hologram disk 1 into a scanning pattern, a window 12 for allowing the laser beam converted into a scanning pattern so as to pass therethrough to scan on an object 12, a focusing lens 16 for focusing the laser beam dispersed by the bar code of the object 12, a second photodetector 17 for detecting the laser beam focused by the focusing lens 16, and a signal analyzing unit 19 for reading reads the bar code information by detecting the output signal of the second photodetector 17 on the basis of the output signal of the first photodetector 15.

Figure 4:
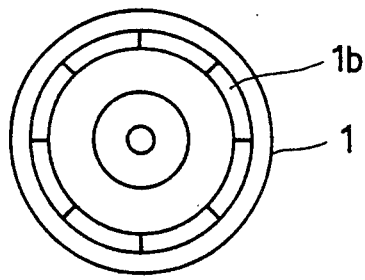
FIG. 4 is a top plan view illustrating a hologram disk according to the present invention.

As shown in FIG. 4, the hologram disk 1 includes arcuate circular shape holograms 1b having a predetermined width and length disposed on a disk so as to be located on the place where the laser beam is to be directed.

Figure 5:
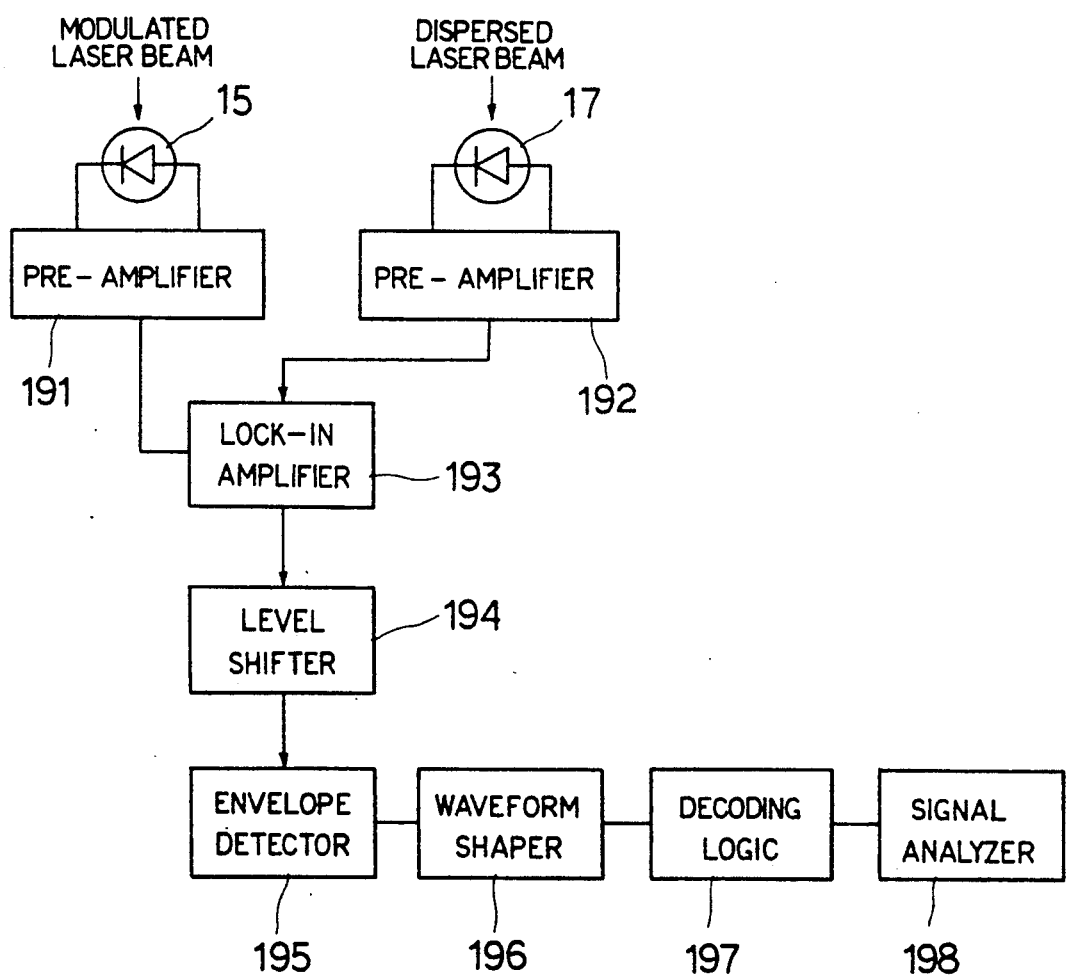
FIG. 5 is a detailed block diagram of a signal analyzing unit of FIG. 3.

As shown in FIG. 5, the signal analyzing unit 19 includes first and second pre-amplifiers 191 and 192 for amplifying the output signals of the first and second photodetectors 15 and 17, respectively, a lock-in amplifier 193 for allowing only the output signal of the second preamplifier 192 so as to pass therethrough on the basis of the output signal of the first pre-amplifier 191, a level shifter 194 for regulating the output signal of the lock-in amplifier 193 to a signal of a predetermined amplitude, an envelope detector 195 for detecting the envelope of the signal outputted from the level shifter 194, a wave form shaping unit 196 for shaping the waveforms of the output signal of the envelope detector 195, a decoding logic unit 197 for decoding the output signal of the wave form shaping unit 196, and a signal analyzing unit 198 for analyzing the output signal of the decoding logic unit 197 to read the bar code information.

Figure 6:
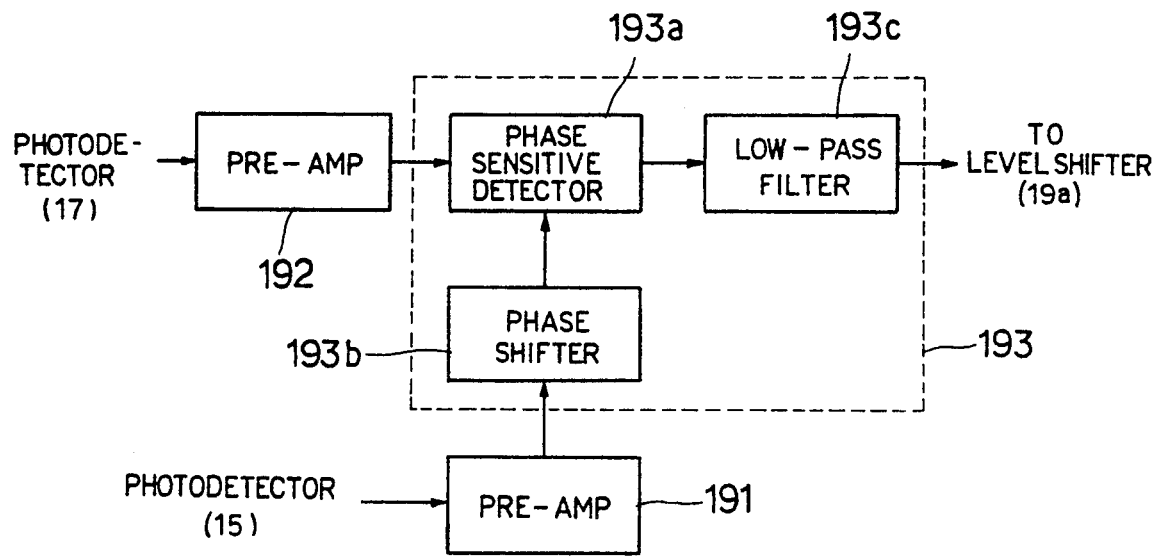
FIG. 6 is a detailed block diagram of a lock-in amplifier means of FIG. 5.

As shown in FIG. 6, the lock-in amplifier 193 incudes in FIG. 6, a phase shifter 191 for shifting the phase of the first preamplifier 191, a phase sensitive detector 193a for carrying out a full-wave rectification of the output signal of second preamplifier 192 on the basis of the output signal of phase shifter 193b, :and a low-pass filter 193c for allowing a direct current signal carrying the bar code information by filtering the output signal of the phase sensitive detector 193a.

Figure 7A:
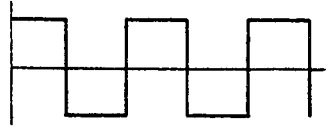
FIG. 7(A) to 7(D) are waveform charts for explaining the operations of FIG. 6.
Figure 7B:
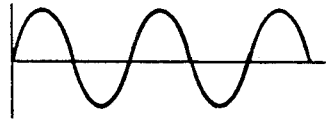

The bar code reader according to the present invention operates as follows:

A laser beam generated from the laser beam generator 3 upon the control of the laser controller 18 is modulated and outputted as shown in FIG. 7(B) and the laser beam is reflected by the reflective mirrors 4 and 4', thereafter, according to the rotation of the hologram disk 1 upon the driving of the motor 2, applied to the mirror member 5 by diffracting from the hologram disk 1 on one hand, and applied to the first photodetector 15 by passing directly through the hologram disk 1 on the other hand.

Figure 7C:
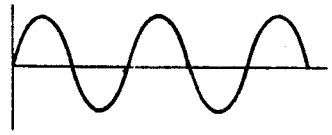

At this moment, the laser beam passed directly through the hologram disk 1 is detected at the first photodetector 15 and amplified by the first pre-amplifier 191, thereafter, applied to the lock-in amplifier 193 in a reference signal. The laser beam diffracted at the hologram disk 1 is converted into a scanning pattern by a mirror member 5 and scanned on an object 12 through a window 6. The laser beam dispersed by the bar code of the object 12 is focused by the focusing lens 16 as shown in FIG. 7(C) and detected by the second photodetector 17, thereafter, amplified at the second pre-amplifier 192 and applied to the lock-in amplifier 193 in a detection signal.

The signal amplified at the first pre-amplifier 191 is shifted by the phase shifter 193b and applied to the phase sensitive detector 193a in a reference signal, and thus the signal output from the second pre-amplifier is full-wave rectified by the phase sensitive detector 193a by synchronizing with the reference signal.

Figure 7D:
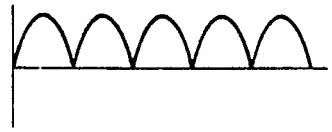

That is, the phase sensitive detector 193a outputs the input signal as it is, when the polarity of the reference signal in response to the modulated laser beam is positive, while it outputs the input signal in an inverted signal when the polarity of the reference signal is negative. Therefore, the laser beam dispersed by the bar code of the object 12 is detected by the photodetector 17 through the focusing lens, and the signal amplified through the second pre amplifier 192 is full-wave rectified as shown in FIG. 7(D) by synchronizing the reference signal of the laser beam modulated at the phase sensitive detector 193a. At this time, the signal of the exterior light which is not synchrous with the frequency of the reference signal remains in a direct current level to function as a ripple.

The signal thus outputted from the phase sensitive detector 193a is filtered at the low-pass filter 193c and converted into a signal of direct current level on which bar code informations are carried.

The direct current level signal outputted from the low-pass filter 193c is converted into a signal of a predetermined amplitude by a level shifter 194 and the envelope of the converted signal is detected at the envelope detector 195 so that the signal having various short pulses forms one pulse. The waveform of this pulse signal is shaped by the waveform shaping unit 196 and decoded by the decoding logic unit 197 so as to be read out by the signal analyzing unit 198 such as a computer, thereby enabling the bar code information to be precisely read without the noise due to an exterior light.

As described above in detail, the present invention has the effect that the size and number of the optical components can be reduced by constituting the system in such that the bar code information is read out by full-wave rectifying the laser beam dispersed from the bar code of an object on the basis of the modulated laser beam.

The invention being thus described, it will be obvious that the same may be varied in many ways. Such variations are not to be regarded as a departure from the spirit and scope of the invention, and all such modifications as would be obvious to one skilled in the art are intended to be included in the scope of the following claims.

WHAT IS CLAIMED IS:

1. A bar code reader comprising:
   a laser controller for controlling the generation of a laser beam;
   a laser beam generator for modulating an outputting the laser beam upon the control of said laser controller;
   a pair of reflective mirrors for reflecting the laser beam outputted from said laser beam generator;

a hologram disk for allowing the laser beam reflected from said reflective mirrors so as to pass therethrough and diffract therefrom;

a first photodetector for detecting the laser beam passed through said hologram disk;

a mirror member for forming the laser beam diffracted from the hologram disk into a scanning pattern;

a window for allowing the laser beam formed into the scanning pattern so as to pass therethrough to scan an object with said bar code reader;

a focusing lens for focusing the laser beam dispersed from said bar code reader with the object;

a second photodetector for detecting the laser beam focused by the focusing lens; and signal analyzing means for reading said bar code information by detecting the output signal of said second photodetector on the basis of the output signal of said first photodetector.

2. The bar code reader of claim 1, wherein the signal analyzing means includes:

first and second pre-amplifiers for amplifying the output signals of said first and second photodetectors; respectively, a lock-in amplifier for allowing only the output signal of said second pre-amplifier so as to pass on the basis of the output signal of said first pre-amplifier;

a level shifter for regulating the output signal of said lock-in amplifier in the signal having a predetermined amplitude;

an envelope detector for detecting the envelope of said amplitude-regulated signal;

a waveform shaping means for waveform-shaping the signal for outputting from the envelope detector;

decoding logic means for decoding said shaped signal; and a signal analyzer for reading the bar code information by analyzing the output signal of said decoding logic means.

3. The bar code reader of claim 2, wherein the lock-in amplifier contains:

a phase shifter for shifting the phase of the output signal of said first pre-amplifier;

a phase sensitive detector for full-wave rectifying the output signal of said second pre-amplifier on the basis of the phase shifter; and a low-pass filter for allowing only the direct current level signal carrying said bar code information so as to pass therethrough by filtering the output signal of the phase detector.

4. The bar code reader of claim 1, wherein the hologram disk has an arcuate circular shaped hologram disposed on a disk where the laser beam is to be applied.

* * * * *